United States Patent
Zheng et al.

(10) Patent No.: US 9,743,477 B2
(45) Date of Patent: Aug. 22, 2017

(54) LIGHTING DEVICE, SMART TERMINAL, LIGHTING-DEVICE NETWORK-FORMING SYSTEM, AND METHODS THEREOF

(71) Applicant: SENGLED OPTOELECTRONICS CO., LTD., Tongxiang (CN)

(72) Inventors: Jianbing Zheng, Tongxiang (CN); Lirong Zhang, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 0 days.

(21) Appl. No.: 15/108,954

(22) PCT Filed: Dec. 29, 2015

(86) PCT No.: PCT/CN2015/099583
§ 371 (c)(1),
(2) Date: Jun. 29, 2016

(87) PCT Pub. No.: WO2016/107565
PCT Pub. Date: Jul. 7, 2016

(65) Prior Publication Data
US 2016/0374169 A1    Dec. 22, 2016

(30) Foreign Application Priority Data
Dec. 30, 2014  (CN) .......................... 2014 1 0843245

(51) Int. Cl.
*G05F 1/00*       (2006.01)
*H05B 37/02*     (2006.01)
(Continued)

(52) U.S. Cl.
CPC ..... *H05B 33/0848* (2013.01); *H05B 33/0815* (2013.01); *H05B 33/0845* (2013.01);
(Continued)

(58) Field of Classification Search
None
See application file for complete search history.

(56) References Cited

U.S. PATENT DOCUMENTS

| 9,131,550 B2* | 9/2015 | Schenk | H05B 37/0272 |
| 2009/0026978 A1* | 1/2009 | Robinson | H05B 37/0272 315/294 |

(Continued)

FOREIGN PATENT DOCUMENTS

| CN | 102892235 A | 1/2013 |
| CN | 104582119 A | 4/2015 |

(Continued)

OTHER PUBLICATIONS

The World Intellectual Property Organization (WIPO) International Search Report for PCT/CN2015/099583 Mar. 10, 2016.

*Primary Examiner* — Anh Tran
(74) *Attorney, Agent, or Firm* — Anova Law Group, PLLC

(57) ABSTRACT

The present disclosure provides a lighting device including a lighting controller, an LED lamp, and a brightness controlling module. The lighting controller is configured for sending first control signals to the LED lamp and the brightness controlling module. The first control signals include an identity of the LED lamp and instruction information for turning on and off the LED lamp. The brightness controlling module is configured for receiving the first control signals sent by the lighting controller and obtaining a previously-stored telegraph code corresponding to the identity of the LED lamp when successively receiving the first control signals instructing to turn on, off, and on the LED lamp within a predetermined time period. The brightness controlling module is configured to adjust a brightness of the LED lamp according to the telegraph code and send (Continued)

out the telegraph code in a manner by changing the brightness of the LED lamp.

11 Claims, 5 Drawing Sheets

(51) Int. Cl.
*H05B 39/04* (2006.01)
*H05B 41/36* (2006.01)
*H05B 33/08* (2006.01)

(52) U.S. Cl.
CPC ..... *H05B 37/0227* (2013.01); *H05B 37/0272* (2013.01); *Y02B 20/48* (2013.01)

(56) References Cited

U.S. PATENT DOCUMENTS

2009/0284366 A1* 11/2009 Haartsen ............... G01S 1/70
340/531
2013/0026945 A1* 1/2013 Ganick ................. G01S 1/70
315/246
2014/0372072 A1* 12/2014 Guo ................... H04B 10/116
702/150

FOREIGN PATENT DOCUMENTS

| CN | 204425709 U | 6/2015 |
| JP | 2013038048 A | 2/2013 |
| WO | 2011092619 A1 | 8/2011 |

\* cited by examiner

LIGHTING DEVICE, SMART TERMINAL, LIGHTING-DEVICE NETWORK-FORMING SYSTEM, AND METHODS THEREOF

CROSS-REFERENCES TO RELATED APPLICATIONS

This application is a national phase entry under 35 U.S.C. §371 of International Application No. PCT/CN2015/099583, filed on Dec. 29, 2015, which claims priority of Chinese Patent Application No. CN201410843245.0, filed on Dec. 30, 2014 The above enumerated patent applications are incorporated by reference herein in their entirety.

FIELD OF THE DISCLOSURE

The present disclosure generally relates to the field of light emitting diode (LED) technologies and, more particularly, relates to a lighting device, a smart terminal, a lighting-device network-forming system, and methods thereof.

BACKGROUND

With the emergence of smart homes, LED (light emitting diode) smart lighting becomes widely used in various areas. Remotely-controlled smart LED lamps may become a standard of the smart lighting for better user experience. To realize remotely-controlled smart LED lamps and/or smart LED lamp groups, it is desirable to connect a plurality of smart LED lamps with a control terminal device in a certain manner. Multiple smart LED lamps may be grouped to form a network.

Currently, transmission protocols for conventional smart LED lamps mainly include WiFi, Bluetooth, Zigbee, and private internet protocols. Often, a user scans the barcode corresponding to a smart LED lamp to connect the smart LED lamp with the control terminal device for communication between the smart LED lamp and the control terminal device. That is, the smart terminal device needs to scan a unique code (e.g., a two-dimensional barcode) corresponding to each smart LED lamp to form the network containing the smart LED lamps such that the smart LED lamps can communicate with the control terminal device.

However, the unique code corresponding to a smart LED lamp is often printed on the body of the smart LED lamp. To scan the unique code, the smart LED lamp needs to be disassembled and then scanned. The disassembling process may be a complicated operation and the network-forming efficiency of the smart LED lamps may be reduced.

BRIEF SUMMARY OF THE DISCLOSURE

The disclosed systems and methods are directed to solve one or more problems set forth above and other problems.

One aspect or embodiment of the present disclosure provides a lighting device. The lighting device includes a lighting controller; an LED lamp; and a brightness controlling module. The lighting controller is connected to the LED lamp and the brightness controlling module and configured for sending first control signals to the LED lamp and the brightness controlling module. The first control signals include an identity of the LED lamp and instruction information for turning on and off the LED lamp. The brightness controlling module is connected to the LED lamp and configured for receiving the first control signals sent by the lighting controller and obtaining a previously-stored telegraph code corresponding to the identity of the LED lamp when successively receiving the first control signals instructing to turn on, off, and on the LED lamp within a predetermined time period. The brightness controlling module is configured to adjust a brightness of the LED lamp according to the telegraph code and send out the telegraph code in a manner by changing the brightness of the LED lamp.

Another aspect or embodiment of the present disclosure provides a smart terminal. The smart terminal includes a camera; a decoder; and a processing module. The camera is connected to the decoder and configured to obtain a brightness change of an LED lamp in a lighting device within a predetermined time period to generate video data to send the video data to the decoder. The decoder is connected to the camera and the processing module and configured to parse the video data sent by the camera, obtain a telegraph code corresponding to the brightness change of the LED lamp during the predetermined time period, and send the telegraph code to the processing module. The processing module is connected to the decoder and configured to look up a pre-stored correspondence relationship between the telegraph code and an identity of the LED lamp based on the telegraph code to determine the identity of the LED lamp and to form a network with the LED lamp based on the identity of the LED lamp.

Another aspect or embodiment of the present disclosure provides a lighting-device network-forming system. The lighting-device network-forming system includes at least one lighting device including a lighting controller, an LED lamp, and a brightness controlling module; and a smart terminal including a camera, a decoder, and a processing module. The lighting controller is connected to the LED lamp and the brightness controlling module and configured for sending first control signals to the LED lamp and the brightness controlling module. The first control signals include an identity of the LED lamp and instruction information for turning on and off the LED lamp. The brightness controlling module is connected to the LED lamp and configured for receiving the first control signals sent by the lighting controller and obtaining a previously-stored telegraph code corresponding to the identity of the LED lamp when successively receiving the first control signals instructing to turn on, off, and on the LED lamp within a predetermined time period. The brightness controlling module is configured to adjust a brightness of the LED lamp according to the telegraph code and to send out the telegraph code in a manner by changing the brightness of the LED lamp. The camera is connected to the decoder and configured to obtain a brightness change of the LED lamp in the lighting device within a predetermined time period to generate video data, and to send to the decoder. The decoder is connected to the camera and the processing module and configured to parse the video data sent by the camera, obtain the telegraph code corresponding to the brightness change of the LED lamp during the predetermined time period, and send the telegraph code to the processing module. The processing module is connected to the decoder and configured to look up a pre-stored correspondence relationship between a telegraph code and an identity of the LED lamp based on the telegraph code to determine the identity of the LED lamp and to form a network with the LED lamp based on the identity of the LED lamp.

Another aspect or embodiment of the present disclosure provides a method for providing an identity of an LED lamp. In the method, a lighting controller in a lighting device sends first control signals to an LED lamp and a brightness controlling module in the lighting device. The first control signals include an identity of the LED lamp and instruction information for turning on and off the LED lamp. The brightness controlling module receives the first control signals sent by the lighting controller, obtains a previously-stored telegraph code corresponding to the identity of the LED lamp when successively receiving the first control signals instructing to turn on, off, and on the LED lamp within a predetermined time period, and adjusts a brightness of the LED lamp according to the telegraph code and sending out the telegraph code by changing the brightness of the LED lamp.

Another aspect or embodiment of the present disclosure provides a method for obtaining an identity of an LED lamp by a smart terminal. A camera obtains a brightness change of an LED lamp in a lighting device within a predetermined time period to generate video data to send to a decoder. The decoder parses the video data sent by the camera to obtain a telegraph code corresponding to the brightness change of the LED lamp during the predetermined time period, and sends the telegraph code to a processing module. The processing module inquires a pre-stored correspondence relationship between the telegraph code and an identity of the LED lamp based on the telegraph code to determine the identity of the LED lamp and to form a network with the LED lamp based on the identity of the LED lamp.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figures 1, 2, 3:
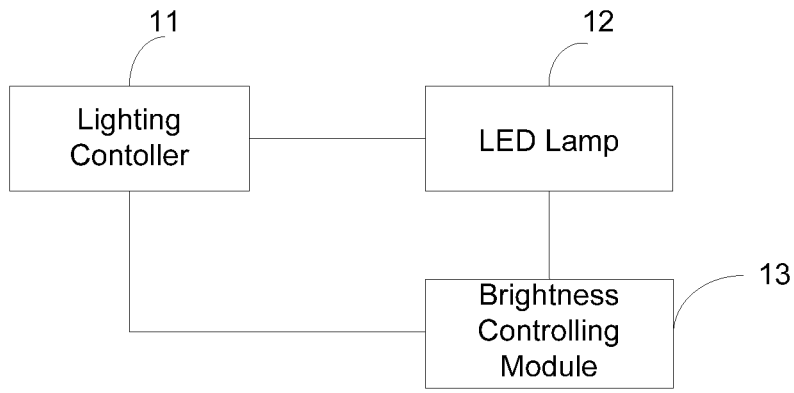
FIG. 1 is a block diagram illustrating an exemplary smart LED lighting device consistent with the disclosed embodiments of the present disclosure.
FIG. 2 illustrates a correspondence relationship between characters in international standard code and Morse code consistent with the disclosed embodiments of the present disclosure.
FIG. 3 illustrates a correspondence relationship between numerals in international standard code and the Morse code consistent with the disclosed embodiments of the present disclosure.

FIG. 1 illustrates an exemplary LED lighting device provided by the present disclosure. As shown in FIG. 1, the LED lighting device may include a lighting controller 11, an LED lamp 12, and a brightness controlling module 13.

The lighting controller 11 may be connected to the LED lamp 12 and the brightness controlling module 13. The lighting controller 11 may be configured to send first control signals to the LED lamp 12 and the brightness controlling module 13. The first control signals may include the identity of the LED lamp 12 and instruction information for turning on and off the LED lamp 12 or instruction information for the LED lamp 12 to emit ("on") light and stop-emitting ("off") the light.

The brightness controlling module 13 may be connected to the LED lamp 12. The brightness controlling module 13 may be configured to receive the first control signals sent by the lighting controller 11. When successively receiving the first control signals sent by the lighting controller 11 for instructing to sequentially turn on, off, and on the LED lamp 12 within a predetermined time period, the brightness controlling module 13 may obtain the previously-stored telegraph code, e.g., in the brightness controlling module 13, corresponding to the identity of the LED lamp 12. The brightness controlling module 13 may adjust the brightness of the LED lamp 12 according to the telegraph code, and send out the telegraph code corresponding to the identity of the LED lamp 12 by changing the brightness of the LED lamp 12.

The lighting controller 11 can be, for example, a remote control device corresponding to the LED lamp 12, and/or a switch connected to the LED lamp 12 for controlling the on and/or off states of the LED lamp 12. The brightness controlling module 13 can be connected to the lighting controller 11 and the LED lamp 12. When in normal operation, the on/off status and the brightness of the LED lamp 12 can be pre-configured through the lighting controller 11 and/or the brightness controlling module 13. Alternatively, the on/off status and the brightness of the LED lamp 12 in normal operation can be pre-configured by the lighting controller 11 and/or the brightness controlling module 13 according to the current/power settings of the corresponding power supply.

In one embodiment, when the brightness controlling module 13 receives three successive first control signals sent by the lighting controller 11 for respectively controlling the LED lamp 12 to be on, off, and on, the brightness controlling module 13 may determine this LED to be an LED that needs to be grouped in forming a network. The brightness controlling module 13 may obtain the telegraph code (e.g., stored previously in the brightness controlling module 13 or the lighting controller 11) corresponding to the identity of the LED lamp 12, and adjust the brightness of the LED lamp 12 according to the telegraph code. By changing the brightness of the LED lamp 12, the brightness controlling module 13 may send out the telegraph code corresponding to the identity of the LED lamp 12 for forming the network, e.g., including a plurality of LED lamps, which are connected with a smart terminal.

For example, when a smart terminal forms a network including a plurality of lighting devices, the smart terminal may send, e.g., three first control signals successively to the remote controller of a LED lamp 12 for controlling the LED lamp 12 to be turned on, off, and on. Alternatively, a user may turn the LED lamp 12 on, off, and on by pressing/controlling corresponding switch of the LED lamp 12. When the LED lamp 12 is controlled to be on, off, and on, the brightness controlling module 13 in the lighting device may determine that the smart terminal is requesting to scan the identity of the corresponding LED lamp 12.

The brightness controlling module 13 may obtain the telegraph code (for example, previously-stored Morse code) corresponding to the identity of the LED lamp 12 and send out the identity of the LED lamp 12 by changing brightness according to the exemplary Morse code. For example, a dot in the Morse code, vocalized as "dit" by the receiver, can be represented by light with high brightness emitted from the LED lamp 12 and lasting for a sufficiently short duration; a dash in the Morse code, vocalized as "dah" by the receiver, can be represented by light with high brightness emitted from the LED lamp 12 and lasting for a sufficiently long duration; and an interval between a dot ("dit") and a dash ("dah") may be represented by light with low brightness emitted from the LED lamp 12. Thus, the Morse code corresponding to the identity of the LED lamp 12 can be sent out by changing the brightness of the LED lamp 12 for the smart terminal to form a network including LED lamps.

For illustrative purposes, the Morse code corresponding to the identity of an LED lamp may be represented by the on, off, and on states of the LED lamp. It should be understood that the Morse code may also be represented by other suitable combination of on and/or off states of the LED lamp according to different applications/embodiments.

FIG. 2 illustrates a correspondence relationship between characters in international standard code and Morse code. FIG. 3 illustrates a correspondence relationship between numerals in international standard code and the Morse code.

By configuring a brightness controlling module 13 in the disclosed lighting device, the brightness controlling module 13 may adjust the brightness of the LED lamp 12 according to the telegraph code corresponding to the identity of the LED lamp 12. The telegraph code corresponding to the identity of the LED lamp 12 can be sent out by changing the brightness of the LED lamp 12 such that the smart terminal can obtain/detect the brightness change of the LED lamp 12 within a predetermined time period. The smart terminal can parse the telegraph code corresponding to the identity of the LED lamp 12 to determine the identity of the LED lamp 12, and form network with the LED lamp 12. Unlike the conventional method, which requires disassembling of the smart LED lamp to obtain the identity of the smart LED lamp, the disclosed method may obtain and send out the identity of the disclosed smart LED lamp without disassembling the smart LED lamp. The operation to obtain the identity of the disclosed smart LED lamp may be desirably simplified. The network-forming efficiency of the smart LED lamps can be improved.

Figure 4:
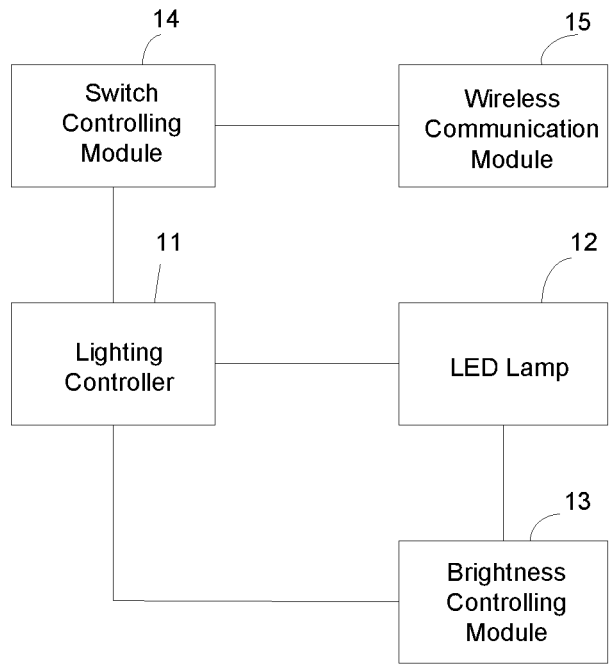
FIG. 4 is a block diagram illustrating another exemplary smart LED lighting device consistent with the disclosed embodiments of the present disclosure.

FIG. 4 illustrates another exemplary lighting device provided by the present disclosure. As shown in FIG. 4, the lighting device may further include a switch controlling module 14 and a wireless communication module 15.

The switch controlling module 14 may be connected to the wireless communication module 15 and the lighting controller 11. The switch controlling module 14 may receive the first control signals sent by the smart terminal via the wireless communication module 15 and send the first control signals to the lighting controller 11.

The lighting controller 11 may be used to control the on and/or off states of the LED lamp 12 according to the first control signals.

Embodiments of the present disclosure provide a method for controlling the on and/or off states of the LED lamps through a smart terminal and a corresponding lighting controller. Specifically, a switch controlling module and a wireless communication module may be assembled in/on the lighting device. The switch controlling module may receive the first control signals sent by the smart terminal through the wireless communication module, and send the first control signals to the lighting controller. The lighting controller may control the on and/or off states of the corresponding LED lamp.

Thus, when the location of the lighting device is beyond the reach of the user, the user can send certain wireless signals to the lighting device to control the on and/or off states of the LED lamp and instruct/command the lighting device to send out the telegraph code corresponding to the identity of the LED lamp.

Figure 5:
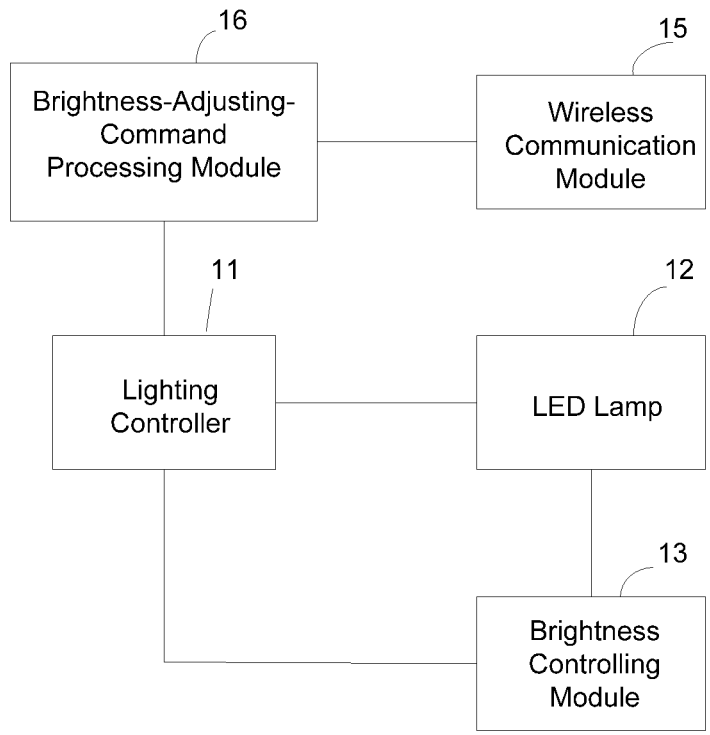
FIG. 5 is a block diagram illustrating another exemplary smart LED lighting device consistent with the disclosed embodiments of the present disclosure.

FIG. 5 illustrates another exemplary lighting device provided by the present disclosure. As shown in FIG. 5, the lighting device, based on the structure shown in FIG. 1, may further include a wireless communication module 15 and a brightness-adjusting-command processing module 16.

The brightness-adjusting-command processing module 16 may be connected to the wireless communication module 15 and the lighting controller 11. After the smart terminal parses and obtains the identity of the LED lamp according to the brightness change of the LED lamp, the smart terminal may send a first-brightness-adjusting-ending command to the brightness-adjusting-command processing module 16 via the wireless communication module 15. The brightness-adjusting-command processing module 16 may receive and then send the first-brightness-adjusting-ending command to the lighting controller 11.

The lighting controller 11 may also be used to adjust the brightness of the LED lamp 12 based on the first-brightness-adjusting-ending command.

Specifically, the lighting controller 11 may adjust the brightness of the LED lamp 12 to a normal brightness (i.e., the brightness of the LED lamp 12 when the LED lamp 12 is in normal operation) based on the first-brightness-adjusting-ending command. Alternatively, the lighting controller 11 may send the first-brightness-adjusting-ending command to the brightness controlling module 13 such that the brightness controlling module 13 may stop adjusting the brightness of the brightness of the LED lamp 12.

In one embodiment, after the smart terminal obtains the brightness change of the LED lamp 12, to reduce harm to human eyes and/or to prevent the LED lamps 12 from having an undesirably shortened service time, the brightness-adjusting-command processing module 16 in the lighting device may receive the first-brightness-adjusting-ending command (i.e., sent by the smart terminal) through the wireless communication module 15, and send the first-brightness-adjusting-ending command to the lighting controller 11 such that the lighting controller 11 may control/adjust the brightness of the LED lamp 12 to the normal brightness. Alternatively, the lighting controller 11 may send the first-brightness-adjusting-ending command to the brightness controlling module 13, and the brightness controlling module 13 may control/adjust the brightness of the LED lamp 12 to the normal brightness.

Figure 6:
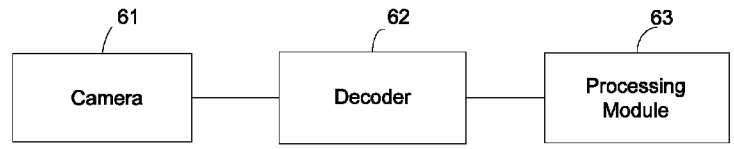
FIG. 6 is a block diagram illustrating an exemplary smart terminal consistent with the disclosed embodiments of the present disclosure.

FIG. 6 illustrates an exemplary smart terminal provided by the present disclosure. As shown in FIG. 6, the smart terminal may include a camera 61, a decoder 62, and a processing module 63.

The camera 61 may be connected to the decoder 62. The camera 61 may receive/obtain the brightness change of the LED lamp 12 within a predetermined time period, and convert the brightness change of the LED lamp 12 to video data. The camera 61 may send the video data to the decoder 62.

The decoder 62 may be connected to the camera 61 and the processing module 63. The decoder 62 may parse the video data sent by the camera 61 to obtain the telegraph code corresponding to the brightness change of the LED lamp 12 during the predetermined time period. The decoder 62 may further send the telegraph code to the processing module 63.

The processing module 63 may be connected to the decoder 62. Based on the telegraph code received, the processing module 63 may look up a correspondence relationship between the telegraph code and the identity of the LED lamp 12 to determine the identity of the LED lamp 12. The processing module 63 may form network with the LED lamp 12 based on the identity of the LED lamp 12.

The camera 61, the decoder 62, and the processing module 63 may be integrated together into one single device or located/distributed separately. For example, the camera 61 may be installed near the LED lamp 12. Alternatively, when the identity of an LED requires to be scanned, certain supporting devices may be used to support the camera 61 such that the LED lamp 12 can be located within the capturing or recording range of the camera 61. The decoder 62 and the processing module 63 may each be located at a fixed position. The camera 61 may be connected to the decoder 62 through wired and/or wireless connection. The decoder 62 may be electrically connected to the processing module 63.

The decoder 62 may be an APP embedded with decoding program with certain decoding programs. A user may use the APP in the smart terminal to form network with certain devices, e.g., smart LED lamps. Specifically, the decoding program may be a cross-platform software development kit (SDK). For example, the SDK can be used to parse the video data, form corresponding spectral graphics, and obtain the telegraph code corresponding to the identity of the LED lamp 12 by parsing the spectral graphics.

The processing module 63 may inquire/search the correspondence relationship between the Morse code and characters in international standard code, as shown in FIG. 2, to determine the identity of the LED lamp 12.

The smart terminal may be a mobile phone, a smart watch, a laptop, a tablet, a desktop, and/or any suitable smart devices.

By configuring a camera, a decoder, and a processing module in the disclosed smart terminal, the camera may obtain the brightness change of the LED lamp in the lighting device within a predetermined time period to form video data. The decoder may parse the video data to obtain the telegraph code corresponding to the identity of the LED lamp. The processing module may inquire the previously-stored correspondence relationship between the telegraph code and the identity of the LED lamp to determine the identity of the LED lamp. A network may then be formed with the LED lamp. Compared to a conventional method for obtaining the identity of a smart LED lamp by disassembling the smart LED lamp, the smart terminal provided by the present disclosure requires desirably simplified operation. Only a smart terminal with a camera and a decoder are required to be contained in the smart terminal to obtain the identity of a smart LED lamp without disassembling the smart LED lamp. The network-forming efficiency of the smart LED lamps can be improved.

Figure 7:
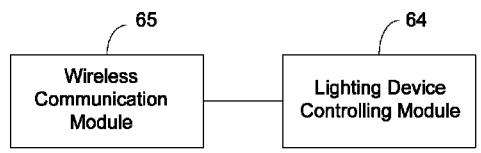
FIG. 7 is a block diagram illustrating another exemplary smart terminal consistent with the disclosed embodiments of the present disclosure.

FIG. 7 illustrates another exemplary smart terminal provided by the present disclosure. As shown in FIG. 7, based on the structure shown in FIG. 6, the smart terminal may further include a wireless communication module 65 and a lighting device controlling module 64.

The lighting device controlling module 64 may be used to send first control signals to the lighting device through the wireless communication module 65 such that the lighting device may control the on and/or off states of the LED lamp according to the first control signals.

Embodiments provided by the present disclosure provide a technical solution for controlling the on and/or off states of the LED lamp. In the technical solution, the first control signals, for controlling the on and/or off states of the LED lamp, may be sent through the lighting device controlling module and the wireless communication module. Thus, a user beyond accessible range to the LED lamp can control the on and/or off states of the LED lamp by sending wireless signals to the lighting device. The difficulty to control the LED lamp and to send out telegraph code can be reduced.

Figure 8:
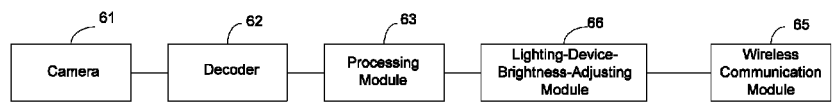
FIG. 8 is a block diagram illustrating another exemplary smart terminal consistent with the disclosed embodiments of the present disclosure.

FIG. 8 illustrates another exemplary smart terminal provided by the present disclosure. As shown in FIG. 8, based on the structure shown in FIG. 6, the smart terminal may further include a lighting-device-brightness-adjusting module 66 and a wireless communication module 65.

The lighting-device-brightness-adjusting module 66 may be connected to the wireless communication module 65 and the processing module 63. After the processing module 63 parses and determines the identity of the LED lamp, the lighting-device-brightness-adjusting module 66 may send the first-brightness-adjusting-ending command to the lighting device such that the lighting device may stop adjusting the brightness of the LED lamp 12 according to the first-brightness-adjusting-ending command.

In one embodiment, after the smart terminal obtains the brightness change of the LED lamp 12, to reduce harm to human eyes and/or to prevent the LED lamps 12 from having an undesirably shortened service time, the smart terminal may send the first-brightness-adjusting-ending command through the wireless communication module 65 such that the lighting device may stop adjusting the brightness of the LED lamp 12. The brightness of the LED lamp 12 can return to the normal brightness in a shortest time.

Figure 9:
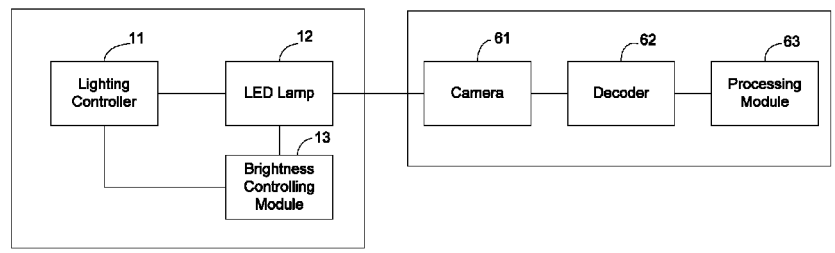
FIG. 9 is a block diagram illustrating an exemplary network-forming system consistent with the disclosed embodiments of the present disclosure.

FIG. 9 illustrates an exemplary network-forming system containing the lighting device provided by the present disclosure. As shown in FIG. 9, the network-forming system may include at least a lighting device and a smart terminal. The lighting device may include a lighting controller 11, an LED lamp 12, and a brightness controlling module 13. The smart terminal may include a camera 61, a decoder 62, and a processing module 63.

The lighting controller 11 may be connected to the LED lamp 12 and the brightness controlling module 13. The lighting controller 11 may send the first control signals to the LED lamp 12 and the brightness controlling module 13. A first control signal may include the identity of the LED lamp 12 and instruction information for turning on, off, and on the LED lamp 12 to emit, stop-emitting, and emit light.

The brightness controlling module 13 may be connected to the LED lamp 12 and configured to receive the first control signals sent by the lighting controller 11. When consecutively receiving the first control signals for commanding the on, off, and on states of the LED lamp within the predetermined time period, the brightness controlling module 13 may obtain the previously-stored telegraph code corresponding to the identity of the LED lamp 12. The brightness controlling module 13 may adjust the brightness of the LED lamp 12 according to the telegraph code, and send out the telegraph code (i.e., corresponding to the identity of the LED lamp 12) in a manner through changing the brightness of the LED lamp 12.

The camera 61 may be connected to the decoder 62 to obtain the brightness change of the LED lamp 12 within the predetermined time period. The camera 61 may form/generate video data and send the video data to the decoder 62.

The decoder 62 may be connected to the camera 61 and the processing module 62 and configured to parse the video data and obtain the telegraph code corresponding to the brightness change of the LED lamp 12 within the predetermined time period. The decoder 62 may send the telegraph code to the processing module 63.

The processing module 63 may be connected to the decoder 62 to inquire/search the correspondence relationship between the identity of the LED lamp 12 and telegraph code. The processing module 63 may further determine the identity of the LED lamp 12 and form network with the LED lamp 12 based on the identity of the LED lamp 12.

The structure, working principles, and technical effects of the lighting device shown in FIG. 9 may be similar to the structure, working principles, and technical effects of the lighting device shown in FIG. 1. The structure of the smart terminal shown in FIG. 9 may be similar to the structure of the smart terminal shown in FIG. 6. Details are thus omitted herein.

In addition, the lighting device shown in FIG. 9 may also include the lighting devices shown in FIGS. 4 and 5, respectively. The smart terminal shown in FIG. 9 may also include the smart terminals shown in FIGS. 7 and 8, respectively. Details are omitted herein.

Embodiments of the present disclosure provide a lighting device network-forming system. By configuring a brightness controlling module in the lighting device, the brightness controlling module may adjust the brightness of the LED lamp in the lighting device according to the telegraph code corresponding to the identity of the LED lamp. Thus, the lighting device can be used to send out telegraph code corresponding to the identity of the LED lamp.

The smart terminal may receive the brightness change of the LED lamp (in the lighting device) within the predetermined time period and form/generate video data. The smart terminal may parse the video data to obtain the telegraph code corresponding to the identity of the LED lamp to determine the identity of the LED lamp. Further, the smart terminal may form network with the LED lamp. Compared to the conventional method to obtain the identity of a smart LED lamp by disassembling and scanning the smart LED lamp, the disclosed system may provide a desirably simplified operation to obtain the identity of the smart LED lamp. By configuring the lighting device with the brightness controlling module, and configuring the smart terminal with the camera and the decoder, the identity of the LED lamp can be obtained without being disassembled. The network-forming efficiency of the smart LED lamps can be improved.

Figure 10:
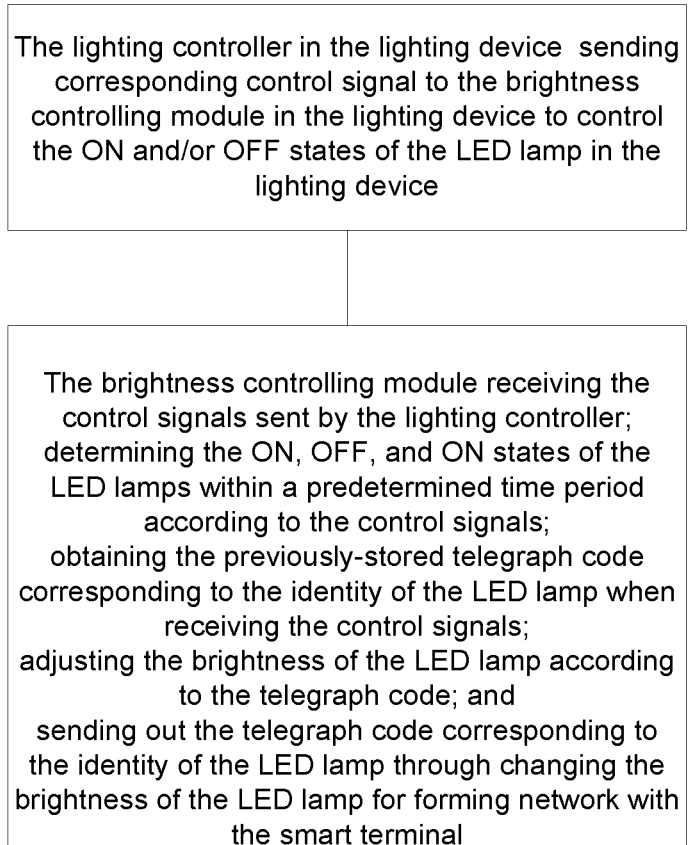
FIG. 10 illustrates an exemplary process for sending out an identity of a smart LED lamp consistent with the disclosed embodiments of the present disclosure.

FIG. 10 illustrates an exemplary process for sending out an identity of an LED lamp provided by the present disclosure. As shown in FIG. 10, the process may include steps 101 and 102.

In step 101, the lighting controller in the lighting device may send the first control signals to the LED lamp and the brightness controlling module. The first control signal may include the identity of the LED lamp and instruction information for turning on, off, and on the LED lamp to emit, stop emitting, and emit light.

In step 102, the brightness controlling module may receive the first control signal sent by the lighting controller. When successively receiving the first control signals sent by the lighting controller for controlling the on, off, and on states of the LED lamp, the brightness controlling module may obtain the telegraph code corresponding to the identity of the LED lamp. Further, the brightness controlling module may adjust the brightness of the LED lamp according the telegraph code corresponding to the identity of the LED lamp and send out the telegraph code in a manner by changing the brightness of the LED lamp.

The method disclosed may be used to operate the lighting device shown in FIG. 1. The working principles and technical effects are aforementioned and omitted herein.

Further, before step 101, the switch controlling module in the lighting device may receive the first control signals sent by the smart terminal through the wireless communication module and send the first control signals to the lighting controller. The lighting controller may control the on and/or off states of the LED lamp according to the first control signals.

Further, to reduce harm to human eyes and avoid the LED lamp to have an undesirably shorted service time, after step 102, the brightness-adjusting-command processing module in the lighting device may receive the first brightness-adjusting-ending command, sent by the smart terminal after the smart terminal parses the brightness change of the LED lamp and obtains the identity of the LED lamp, through the wireless communication module. The brightness-adjusting-command processing module may send the first brightness-adjusting-ending command to the lighting controller such that the lighting controller may stop adjusting the brightness of the LED lamp according to the first brightness-adjusting-ending command.

In the method for sending out the identity of the LED lamp provided by the present disclosure, the brightness controlling module in the lighting device may adjust the brightness of the LED lamp according to the telegraph code corresponding to the identity of the LED lamp such that the telegraph code corresponding to the identity of the LED lamp can be sent out. The lighting device network-forming system may obtain the brightness change of the LED lamp within the predetermined time period, and parse the telegraph code corresponding to the identity of the LED lamp to determine the identity of the LED lamp. The lighting device network-forming system may thus form network with the LED lamp based on the identity of the LED lamp. Compared to a conventional method for obtaining the identity of a smart LED lamp by requiring the user to disassemble the smart LED lamp, the method provided by the present disclosure is desirably simplified. The disclosed method may enable the identity of a smart LED lamp to be sent to the lighting device network-forming system without disassembling the smart LED lamp. The network-forming efficiency of the smart LED lamps can be improved.

Figure 11:
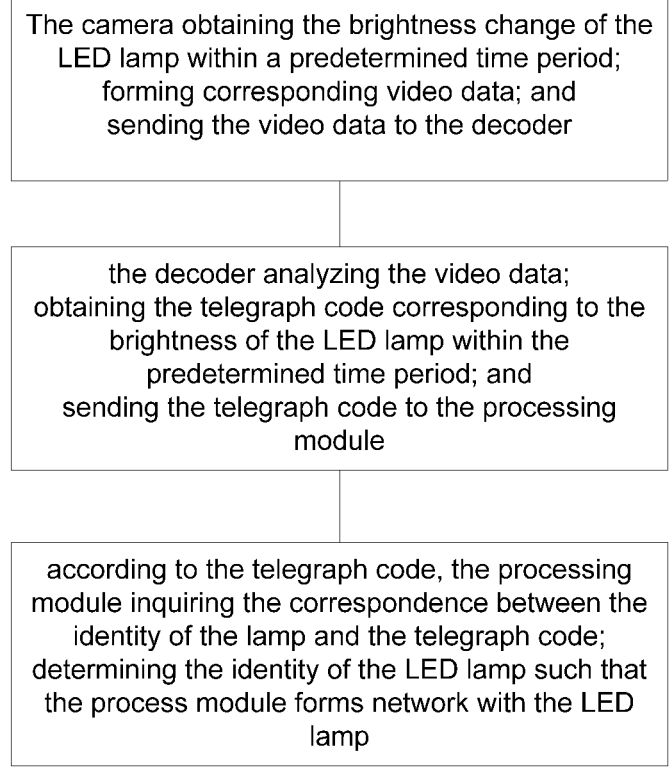
FIG. 11 illustrates an exemplary process for obtaining an identity of a smart LED lamp consistent with the disclosed embodiments of the present disclosure.

FIG. 11 illustrates an exemplary process for obtaining the identity of the LED lamp provided by the present disclosure. As shown in FIG. 11, the process may include steps 111 to 113.

In step 111, the camera may obtain the brightness change of the LED lamp within a predetermined time period, form corresponding video data, and send the video data to the decoder.

In step 112, the decoder may parse the video data, obtain the telegraph code corresponding to the brightness change of the LED lamp within the predetermined time period, and send the telegraph code to the processing module.

In step 113, according to the telegraph code, the processing module may inquire the correspondence relationship between the identity of the lamp and the telegraph code to determine the identity of the LED lamp such that a network may be formed with the LED lamp based on the identity of the LED lamp.

Further, before step 111, the lighting device controlling module may send the first control signals to the lighting device through the wireless communication module such that the lighting device may control the on and/or off states of the LED lamp according to the first control signals.

Further, after step 113, after parsing the telegraph code corresponding to the identity of the LED lamp to determine the identity of the LED lamp, the lighting-device-brightness-adjusting module may send the first brightness-adjusting-ending command to the lighting device through the wireless communication module such that the lighting device may stop adjusting the brightness of the LED lamp according to the first brightness-adjusting-ending command.

In the method for obtaining the identity of the LED lamp provided by the present disclosure, the camera may obtain the brightness change of the LED lamp (i.e., in the lighting device) within the predetermined time period and form video data. The decoder may parse the video data to obtain the telegraph code corresponding to the identity of the LED lamp. The processing module may inquire the correspondence relationship (i.e., previously stored) between the identity of the LED lamp and the telegraph code to determine the identity of the LED lamp and form network with the LED lamp. Compared to the conventional method to obtain the identity of a smart LED lamp by disassembling and scanning the smart LED lamp, the disclosed method may provide a desirably simplified operation to obtain the identity of the smart LED lamp. By configuring a lighting device network-forming system with a camera and a decoder, the identity of the LED lamp can be obtained without being disassembled. The network-forming efficiency of the smart LED lamps can be improved.

It should be noted that, the present disclosure can be realized through software and/or hardware. For example, the devices disclosed may be implemented by using application-specific integrated circuits (ASICs) or other suitable/similar hardware. In certain embodiments, the software programs in the present disclosure may be executed through a processor to realize the functions/steps. Similarly, the software programs (including relevant data structure) of the present disclosure can be saved in the readable recording medium of a computer, e.g., a RAM (random access memory), a magnetic drive, an optical drive, a floppy drive, and/or other suitable medium. In addition, certain steps and/functions of the present disclosure can be realized through hardware. For example, a processor can coordinate with certain circuits to realize corresponding functions/steps of the present disclosure.

The embodiments disclosed herein are exemplary only. Other applications, advantages, alternations, modifications, or equivalents to the disclosed embodiments are obvious to those skilled in the art and are intended to be encompassed within the scope of the present disclosure.

REFERENCE SIGN LIST

Lighting controller 11
LED lamp 12
Brightness controlling module 13
Switch controlling module 14
Wireless communication module 15
Brightness-adjusting-command processing module 16
Camera 61
Decoder 62
Processing module 63
Wireless communication module 65
Lighting device controlling module 64

What is claimed is:

1. A lighting device, comprising:
a lighting controller; an LED lamp; and a brightness controlling module, wherein:
the lighting controller is connected to the LED lamp and the brightness controlling module and configured for sending first control signals to the LED lamp and the brightness controlling module, wherein the first control signals include an identity of the LED lamp and instruction information for turning on and off the LED lamp, and
the brightness controlling module is connected to the LED lamp and configured for receiving the first control signals sent by the lighting controller and obtaining a previously-stored telegraph code corresponding to the identity of the LED lamp when successively receiving the first control signals instructing to turn on, off, and on the LED lamp within a predetermined time period, wherein the brightness controlling module is configured to adjust a brightness of the LED lamp according to the telegraph code and send out the telegraph code in a manner by changing the brightness of the LED lamp;
wherein the lighting device further comprises a switch controlling module and a wireless communication module, wherein:
the switch controlling module is connected to the wireless communication module and the lighting controller, and configured to receive the first control signals sent by a smart terminal via the wireless communication module and to send the first control signals to the lighting controller, and
the lighting controller is further configured to control the on and off status of the LED lamp according to the first control signals.

2. The lighting device according to claim 1, further including:
a brightness-adjusting-command processing module, wherein:
the brightness-adjusting-command processing module is connected to the wireless communication module and the lighting controller, and configured to receive a first-brightness-adjusting-ending command sent by the smart terminal via the wireless communication module after the smart terminal parses and obtains the identity of the LED lamp according to a brightness change of the LED lamp, and configured to send the first-brightness-adjusting-ending command to the lighting controller, and the lighting controller is configured, in response to the first-brightness-adjusting-ending command, to stop adjusting the brightness of the LED lamp based on the telegraph code.

3. A smart terminal, comprising:
a camera; a decoder; and a processing module, wherein:
the camera is connected to the decoder and configured to obtain a brightness change of an LED lamp in a lighting device within a predetermined time period to generate video data to send the video data to the decoder;
the decoder is connected to the camera and the processing module and configured to parse the video data sent by the camera, obtain a telegraph code corresponding to the brightness change of the LED lamp during the predetermined time period, and send the telegraph code to the processing module; and
the processing module is connected to the decoder and configured to look up a pre-stored correspondence relationship between the telegraph code and an identity of the LED lamp based on the telegraph code to determine the identity of the LED lamp and to form a network with the LED lamp based on the identity of the LED lamp;
wherein the smart terminal further comprises a wireless communication module and a lighting device controlling module, wherein:
the lighting device controlling module is configured to send first control signals to the lighting device through the wireless communication module such that the lighting device controls on and off states of the LED lamp according to the first control signals.

4. The smart terminal according to claim 3, further including:
a lighting-device-brightness-adjusting module, wherein:
the lighting-device-brightness-adjusting module is connected to the wireless communication module and the processing module, and configured, after the processing module parses and determines the identity of the LED lamp, to send a first-brightness-adjusting-ending command to the lighting device via the wireless communication module, such that the lighting device stops adjusting the brightness of the LED lamp in response to the first-brightness-adjusting-ending command.

5. A lighting-device network-forming system, comprising:
at least one lighting device including a lighting controller, an LED lamp, and a brightness controlling module; and
the smart terminal according to claim 3, wherein:
the lighting controller is connected to the LED lamp and the brightness controlling module and configured for sending first control signals to the LED lamp and the brightness controlling module, wherein the first control signals include an identity of the LED lamp and instruction information for the LED lamp to emit or stop-emitting light, and
the brightness controlling module is connected to the LED lamp and configured for receiving the first control signals sent by the lighting controller and obtaining a previously-stored telegraph code corresponding to the identity of the LED lamp when successively receiving the first control signals instructing to turn on, off, and on the LED lamp within a predetermined time period, wherein the brightness controlling module is configured to adjust a brightness of the LED lamp according to the telegraph code and to send out the telegraph code in a manner by changing the brightness of the LED lamp.

6. A method for providing an identity of an LED lamp, comprising:
sending, by a lighting controller in a lighting device, first control signals to an LED lamp and a brightness controlling module in the lighting device, wherein the first control signals include an identity of the LED lamp and instruction information for turning on and off the LED lamp; and
receiving, by the brightness controlling module, the first control signals sent by the lighting controller, obtaining a previously-stored telegraph code corresponding to the identity of the LED lamp when successively receiving the first control signals instructing to turn on, off, and on the LED lamp within a predetermined time period, and adjusting a brightness of the LED lamp according to the telegraph code and sending out the telegraph code by changing the brightness of the LED lamp;
wherein, prior to the step of sending, by a lighting controller in a lighting device, first control signals to an LED lamp and a brightness controlling module, the method further includes:
receiving, by the switch controlling module in the lighting device, the first control signals sent by a smart terminal through a wireless communication module, and
sending, by the switch controlling module, the first control signals to the lighting controller such that the lighting controller controls on and off states of the LED lamp according to the first control signals.

7. The method according to claim 6, wherein, after the step of receiving, by the brightness controlling module, the first control signals, obtaining a previously-stored telegraph code and adjusting a brightness of the LED lamp and sending out the telegraph code by changing the brightness of the LED lamp, the method further includes:
receiving, by a brightness-adjusting-command processing module in the lighting device, a first-brightness-adjusting-ending command sent by the smart terminal via the wireless communication module after the smart terminal parses and obtains the identity of the LED lamp according to a brightness change of the LED lamp, and
sending, by the brightness-adjusting-command processing module in the lighting device, the first-brightness-adjusting-ending command to the lighting controller, and
in response to the first-brightness-adjusting-ending command, stopping adjusting, by the lighting controller, the brightness of the LED lamp based on the telegraph code.

8. The method according to claim 6, further comprising:
obtaining the identity of the LED lamp by a smart terminal, comprising by:
obtaining, by a camera, a brightness change of the LED lamp in the lighting device within a predetermined time period to generate video data to send to a decoder;
parsing, by the decoder, the video data sent by the camera to obtain the telegraph code corresponding to the brightness change of the LED lamp during the predetermined time period, and send the telegraph code to a processing module; and
inquiring, by the processing module, a pre-stored correspondence relationship between the telegraph code and an identity of the LED lamp based on the telegraph code to determine the identity of the LED lamp and to form a network with the LED lamp based on the identity of the LED lamp.

9. The method according to claim 8, wherein, prior to the step of obtaining, by a camera, a brightness change of an LED lamp in a lighting device within a predetermined time period to generate video data to send to a decoder, the method further includes:

sending, by a lighting device controlling module, first control signals to the lighting device through a wireless communication module such that the lighting device controls on and off states of the LED lamp according to the first control signals.

10. The method according to claim 8, wherein, after the step of inquiring, by the processing module, the method further includes:

after the processing module parses and determines the identity of the LED lamp, sending, by a lighting-device-brightness-adjusting module, a first-brightness-adjusting-ending command to the lighting device via the wireless communication module, such that the lighting device stops adjusting the brightness of the LED lamp in response to the first-brightness-adjusting-ending command.

11. A lighting-device network-forming system, comprising:

at least one lighting device including the lighting device according to claim 1; and a smart terminal including a camera, a decoder, and a processing module, wherein:

the camera is connected to the decoder and configured to obtain a brightness change of the LED lamp in the lighting device within a predetermined time period to generate video data, and to send to the decoder, the decoder is connected to the camera and the processing module and configured to parse the video data sent by the camera, obtain the telegraph code corresponding to the brightness change of the LED lamp during the predetermined time period, and send the telegraph code to the processing module, and the processing module is connected to the decoder and configured to look up a pre-stored correspondence relationship between a telegraph code and an identity of the LED lamp based on the telegraph code to determine the identity of the LED lamp and to form a network with the LED lamp based on the identity of the LED lamp.

\* \* \* \* \*